United States Patent
Wada

(10) Patent No.: US 10,473,910 B2
(45) Date of Patent: Nov. 12, 2019

(54) OBSERVATION DEVICE

(71) Applicant: CANON KABUSHIKI KAISHA, Tokyo (JP)

(72) Inventor: Ken Wada, Sakura (JP)

(73) Assignee: CANON KABUSHIKI KAISHA, Tokyo (JP)

(*) Notice: Subject to any disclaimer, the term of this patent is extended or adjusted under 35 U.S.C. 154(b) by 195 days.

(21) Appl. No.: 15/642,873

(22) Filed: Jul. 6, 2017

(65) Prior Publication Data
US 2018/0011307 A1 Jan. 11, 2018

(30) Foreign Application Priority Data
Jul. 11, 2016 (JP) .................................. 2016-13667

(51) Int. Cl.
| | | |
|---|---|---|
| G02B 23/12 | (2006.01) | |
| G02B 23/18 | (2006.01) | |
| G02B 27/01 | (2006.01) | |
| B29L 11/00 | (2006.01) | |

(52) U.S. Cl.
CPC .............. G02B 23/12 (2013.01); G02B 23/18 (2013.01); G02B 27/0101 (2013.01); *B29L 2011/0016* (2013.01)

(58) Field of Classification Search
CPC ........ G02B 23/12; G02B 23/14; G02B 23/18; G02B 13/18; G02B 27/0101
See application file for complete search history.

(56) References Cited

U.S. PATENT DOCUMENTS

| | | | |
|---|---|---|---|
| 2010/0290129 A1* | 11/2010 | Nishio | ................. G02B 25/001 |
| | | | 359/645 |
| 2016/0062091 A1 | 3/2016 | Wada | |
| 2017/0108702 A1* | 4/2017 | Rabner | ............. G02B 27/0101 |

FOREIGN PATENT DOCUMENTS

| | | |
|---|---|---|
| JP | 2004-219594 A | 8/2004 |
| JP | 2008-083096 A | 4/2008 |

* cited by examiner

*Primary Examiner* — William R Alexander
*Assistant Examiner* — Ephrem Z Mebrahtu
(74) *Attorney, Agent, or Firm* — Carter, DeLuca & Farrell LLP

(57) ABSTRACT

In an observation device including a display device, paired ocular optical systems each include a resin lens having a shape defined by an arch and a chord, and provided with a molding gate in an outer peripheral portion of the arc shape, and is appropriately set in: a difference RC between the radius of the resin lens and the length of a line connecting the midpoint of the chord and the point on the optical axis; the diameter D of the resin lens; an angle θ between a direction connecting a midpoint of a long side of the display surface and the point on the optical axis and a direction connecting the molding gate and the point on the optical axis; and an acute angle α between directions connecting the point on the optical axis and the respective molding gates of the resin lenses in the paired ocular optical systems.

5 Claims, 7 Drawing Sheets

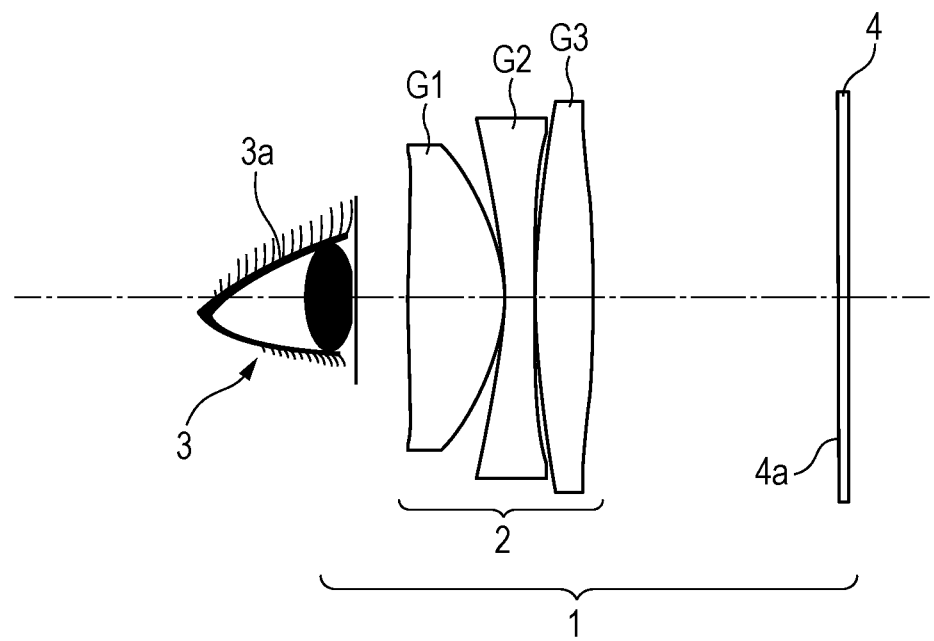
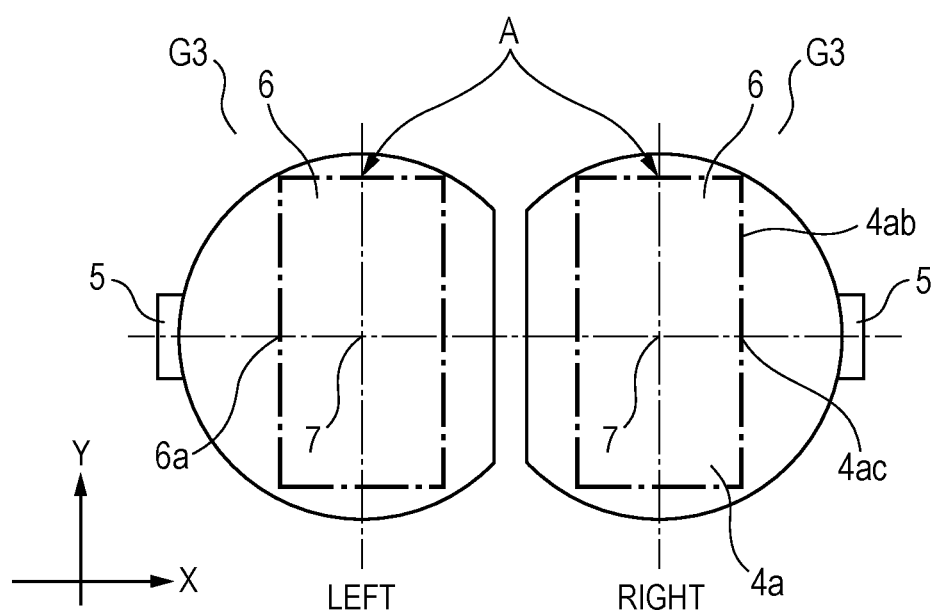

OBSERVATION DEVICE

BACKGROUND OF THE INVENTION

Field of the Invention

The present invention relates to an observation device with which an image displayed on a display surface of a display element such as a liquid crystal display is enlarged for observation.

Description of the Related Art

Ocular optical systems used in many binoculars and the like generally each have an observation angle of view of about 30°. When an ocular optical system is increased in the observation angle of view with the eye relief of an appropriate length maintained, the lens outer diameter becomes large and the lens weight increases.

There has been conventionally known an ocular optical system using a resin material (plastic) with a specific gravity lower than a glass material to achieve weight reduction of the ocular optical system. Japanese Patent Application Laid-Open No. 2008-83096 discloses an achromatic lens system in which the weight of the entire system is reduced by using resin lenses and diffraction optical elements. The optical characteristics of the resin material tend to change when the environment changes. Moreover, when the resin material is used in an optical system of an observation device or the like, the optical system may deteriorate in optical performance due to an optical distortion by molding or the like.

There has been conventionally known a lens system optical device which is less affected by an optical distortion by molding in manufacturing of a lens made of a resin material. Japanese Patent Application Laid-Open No. 2004-219594 discloses a lens system optical device in which the position of a molding gate used in molding a plastic lens is appropriately set to achieve a small optical distortion.

In an ocular optical system used in a head-mounted display type observation device, there is not only a demand for an observation angle of view wider than that of a binocular but also a demand for weight reduction because the burden on an observer wearing the device is large when the device is heavy.

SUMMARY OF THE INVENTION

An object of the present invention is to provide an observation device which can provide binocular vision of an image displayed on a display element with a wide angle of view and an excellent optical performance while achieving reduction in size and weight of ocular optical systems by using resin lenses.

An observation device of the present invention is an observation device including: a display element having a rectangular display surface; and a pair of ocular optical systems for use to observe an image displayed on the display surface, each of the paired ocular optical systems includes a resin lens having a shape defined by an arch and a chord on a cross section perpendicular to an optical axis, the resin lens is provided with a molding gate in a portion of an outer periphery of the shape defined by the arc, and the following conditional expressions are satisfied:

$$0.08 < Rc/D < 0.30$$

$$-35° \leq \theta \leq 35°$$

$$0° \leq |\alpha| < 40°,$$

where Rc is a difference between a radius of the resin lens and a length of a line connecting a midpoint of the chord and a point on the optical axis on the cross section perpendicular to the optical axis, D is a diameter of the resin lens, θ is an angle between a direction connecting a midpoint of a long side of the display surface and the point on the optical axis on the cross section perpendicular to the optical axis and a direction connecting the molding gate and the point on the optical axis on the cross section perpendicular to the optical axis, and α is an acute angle out of angles formed between a direction connecting the point on the optical axis and the molding gate of the resin lens included in one of the paired ocular optical systems and a direction connecting the point on the optical axis and the molding gate of the resin lens included in the other ocular optical system on the cross section perpendicular to the optical axis.

Further features of the present invention will become apparent from the following description of exemplary embodiments with reference to the attached drawings.

BRIEF DESCRIPTION OF THE DRAWINGS

FIG. 1 is a schematic diagram illustrating a main portion of an observation device in the present invention.

FIG. 2 is a diagram for explaining positions of effective regions and molding gates in resin lenses used in the observation device in Embodiment 1.

DESCRIPTION OF THE EMBODIMENTS

Figure 3:
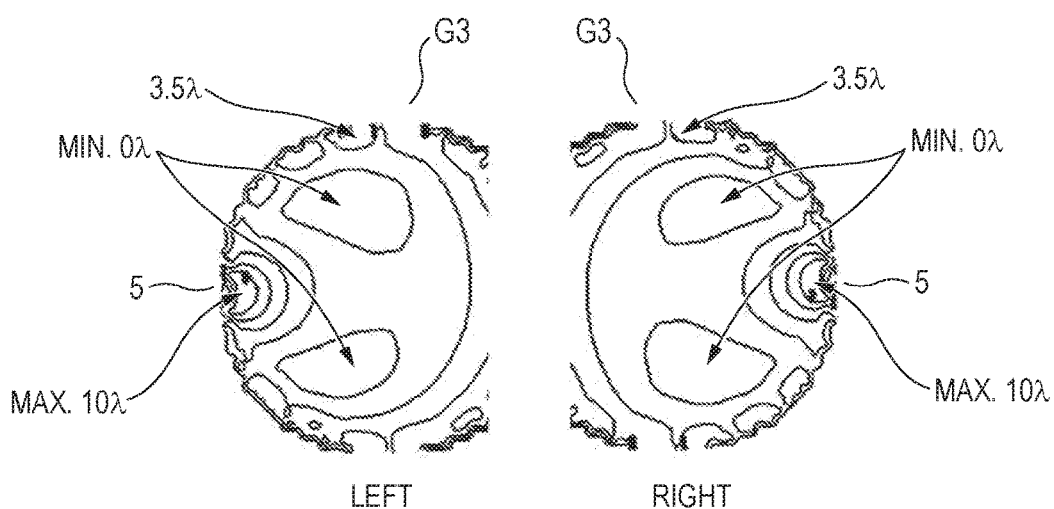
FIG. 3 is a diagram for explaining a phase map of the resin lenses included in ocular optical systems in Embodiment 1.

Preferred embodiments of the present invention will now be described below in accordance with the accompanying drawings. An observation device in the present invention includes: display elements having rectangular display surfaces; and a pair of ocular optical systems used to observe images displayed on the display surfaces. Each of the paired ocular optical systems includes a resin lens having a shape defined by an arc and a chord on a cross section perpendicular to an optical axis. The resin lens is provided with a molding gate (gate) in a portion of an outer periphery of the shape defined by the arc.

FIG. 1 illustrates a schematic configuration diagram of an observation device in the present invention. The observation device 1 of the present invention includes a pair of ocular optical systems 2 for the left and right eyes and display elements 4. FIG. 1 illustrates only one of the ocular optical systems 2 for the sake of convenience. In FIG. 1, reference numeral 3 denotes an eye point (observation position). Light fluxes from the display elements 4 having display surfaces 4a pass through the ocular optical systems 2 to be guided to observing eyes 3a located near the eye point 3.

Each of the ocular optical systems 2 includes a positive (positive refractive power) lens (G1), a negative (negative refractive power) lens (G2), and a positive lens (G3), in this order from the eye point 3 side. The material of the positive lens G1 is glass. The negative lens G2 and the positive lens G3 with large outer diameters are resin lenses made of a resin material (plastic material).

FIG. 2 is a schematic diagram of a main portion of the pair of resin lenses G3 included respectively in the paired ocular optical systems 2 in Embodiment 1 of the present invention. In FIG. 2, only one of the resin lenses G2 and G3 in FIG. 1 is illustrated as an example. FIG. 2 illustrates the pair of resin lenses G3 as viewed from the display elements 4. Each of the resin lenses G3 has a shape defined by an arc and a chord on a cross section perpendicular to an optical axis 7. Moreover, each resin lens G3 is provided with a molding gate 5 in a portion of an outer periphery of the shape defined by the arc.

An optical glass being a general material has a specific gravity of 2 to 6 g/cm$^3$ while a plastic being one type of resin material has a specific gravity close to 1 g/cm$^3$. Accordingly, an effect of reducing the weight of the ocular optical systems 2 can be expected to be obtained by using the plastic.

In each ocular optical system 2, in order to achieve a wide observation angle of view of about 50° with one eye, the outer diameter of the positive lens (G1) arranged closest to the eye point 3 reaches approximately φ50 mm and the outer diameters of the negative lens G2 and the positive lens G3 arranged on the liquid crystal display element 4 side reach approximately φ70 mm. Since observation positions for binocular vision are set to secure viewing points suiting a general interpupillary distance of a human that is, about 60 mm, such lens sizes may cause interference between the ocular optical systems 2 for the left and right eyes.

Figure 13:
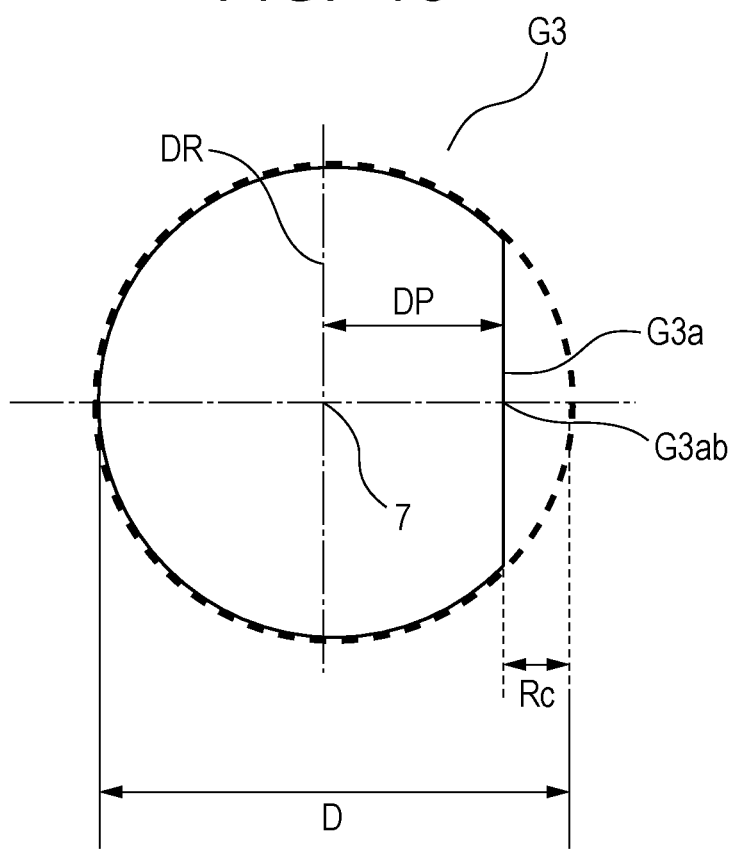
FIG. 13 is a diagram for explaining a cut amount of a cut lens.

In view of this, in the embodiments, a portion on a circumference of each of the resin lenses with large outer diameters is cut away such that the outer shape of the resin lens is formed in a D-shape as illustrated in FIG. 13. FIG. 13 illustrates the resin lens G3 out of the resin lenses G2 and G3 as an example. In FIG. 13, a length between a midpoint G3ab of a chord G3a and a point on the optical axis 7 on a cross section perpendicular to the optical axis 7 is denoted by DP. The radius of the resin lens G3 is denoted by DR. The difference between the radius DR and the length DP (cut amount) is denoted by Rc. The diameter of the resin lens G3 is denoted by D.

In FIG. 2, an angle between a direction connecting a midpoint 4ac of a long side 4ab of a display surface 4a and a point on the optical axis 7 (on the optical axis) on a cross section perpendicular to the optical axis 7 and a direction connecting the molding gate 5 and the point on the optical axis 7 on the cross section perpendicular to the optical axis 7 is denoted by θ. An acute angle out of angles formed between a direction connecting the point on the optical axis 7 and the molding gate 5 of the resin lens included in one of the paired ocular optical systems 2 on the cross section perpendicular to the optical axis 7 and a direction connecting the point on the optical axis 7 and the molding gate 5 of the resin lens included in the other ocular optical system 2 on the cross section perpendicular to the optical axis 7 is denoted by a. In this case, the embodiments satisfy the following conditional expressions (1) to (3).

$$0.08 < Rc/D < 0.30 \quad (1)$$

$$-35° \leq \theta \leq 35° \quad (2)$$

$$0° \leq |\alpha| < 40° \quad (3)$$

The conditional expression (1) expresses a ratio of the lens cut amount Rc to the outer diameter D of the resin lens. When the ratio is equal to or falls below the lower limit of the conditional expression (1), the weight reduction effect of the ocular optical systems 2 decreases. On the other hand, when the ratio is equal to or exceeds the upper limit, vignetting of the light flux occurs and the observation angle of view is narrowed. Hence, these cases are not preferable. The numerical value range of the conditional expression (1) is more desirably set as follows, and this setting can achieve ocular optical systems 2 with a higher weight reduction effect.

$$0.10 < Rc/D < 0.20 \quad (1a)$$

In the embodiments, the positive lens (G3) arranged closest to the display element 4 has the largest outer diameter. Accordingly, in the embodiments, at least the outer diameter of the positive lens G3 is reduced.

The conditional expression (2) relates to the position of the molding gate in each resin lens. When θ exceeds the upper limit of the conditional expression (2) or falls below the lower limit thereof, a light flux of the maximum angle of view passes near a position of the molding gate and is greatly affected by an optical distortion, which makes good observation difficult. The numerical value range of the conditional expression (2) is more preferably set as follows.

$$-30° \leq \theta \leq 30° \quad (2a)$$

The conditional expression (3) specifies the positions of the molding gates of the resin lenses relative to each other. When |α| is equal to or exceeds the upper limit of the conditional expression (3), the effect of the optical distortion near the molding gate varies greatly between the optical systems for the left and right eyes, and the exceeding of the upper limit is thus not preferable. The numerical value range of the conditional expression (3) is more preferably set as follows. This setting can achieve ocular optical systems with a higher weight reduction effect.

$$0° \leq |\alpha| < 30° \quad (3a)$$

In the embodiments, the amount of phase difference between the optical distortion of the resin lens included in one of the paired ocular optical systems 2 and the optical distortion of the resin lens included in the other ocular optical system 2 in the direction of the long sides of the display surfaces 4a is denoted by Δrel. An observation dominant wavelength (wavelength 550 nm) is denoted by λ. In this case, the conditional expression of $$0.0 \leq |\Delta rel/\lambda| < 5.0 \quad (4)$$

is satisfied.

The conditional expression (4) specifies the relative phase difference, that is the optical distortion amount which is affected when the pupils are oscillated at the paired ocular optical systems 2 for the left and right eyes. When |Δrel/λ| is equal to or exceeds the upper limit of the conditional expression (4), the observation condition varies between the left and right eyes as in the conditional expression (3), and the exceeding of the upper limit is thus not preferable. The numerical value range of the conditional expression (4) is more desirably set as follows. This setting can achieve ocular optical systems 2 with a higher weight reduction effect.

$$0.0 \leq |\Delta rel/\lambda| < 3.0 \qquad (4a)$$

In the embodiments, the maximum value of the optical distortion in each resin lens is denoted by $\Delta$. In this case, the conditional expression of $$0.0 \leq |\Delta/\lambda| < 12.0 \qquad (5)$$

is satisfied.

The conditional expression (5) specifies the phase difference, that is the optical distortion amounts in the lenses made of the resin material. When $|\Delta/\lambda|$ is equal to or exceeds the upper limit of the conditional expression (5), the optical performance in monocular observation decreases greatly. The numerical value range of the conditional expression (5) is more desirably set as follows. This setting can achieve ocular optical systems with a higher weight reduction effect.

$$0.0 \leq |\Delta/\lambda| \leq 10.0 \qquad (5a)$$

In the embodiments, the resin lenses are preferably arranged closest to the display elements 4 in the ocular optical systems 2. The resin lenses respectively in the paired ocular optical systems 2 are arranged such that the chords are adjacent to each other on the cross section perpendicular to the optical axis 7. This facilitates size reduction of the observation device. Next, the resin lenses in each of the embodiments are described.

Embodiment 1

FIG. 2 is the schematic view of the main portion of the pair of resin lenses forming the pair of ocular optical systems 2 in Embodiment 1 of the present invention. FIG. 2 is a diagram of the positive lenses G3 being the pair of resin lenses, as viewed from the display element 4 side. Each positive lens G3 is cut away by 10 mm in the interpupillary direction (X direction) with respect to the outer diameter of $\varphi 70$ mm (conditional expression (1)=0.143). Forming such a cut shape in the lens outer peripheral portion enables that, in observation optical systems with a wide observation field of view, the optical axis positions of the ocular optical systems 2 for the left and right eyes can be appropriately adjusted for a person whose interpupillary distance is about 60 mm.

Furthermore, FIG. 2 also illustrates the positions of the gates 5 used in the resin molding in the positive lenses G3 forming the ocular optical systems 2 for the left and right eyes. In Embodiment 1, there are used the display elements 4 having the display surfaces 4a elongating in the vertical Y direction (illustrated). Thus, effective regions 6 through which light fluxes from the display elements 4 pass correspond to the regions surrounded by the one-dot chain lines. Outer peripheral portions of the regions through which light fluxes of the maximum angle of view in the vertical Y direction pass correspond to the points A illustrated in FIG. 2.

FIG. 3 illustrates the optical distortions occurring in the positive lenses G3 as a phase map. FIG. 3 illustrates the optical distortions in the ocular optical system for the left eye and the ocular optical system for the right eye, and the optical distortions are great near the gates 5 (illustrated). Note that, for example, the device with the product name "KOBARA series" made by Oji Scientific Instruments Co., Ltd. can be used as a device for measuring the phase difference of the optical distortions. The optical distortion is also referred to as birefringence. Particularly, in an observation device utilizing polarization, the optical distortion corresponds to a factor which disrupts polarization in an optical system, and greatly affects an imaging performance depending on the amount of the optical distortion.

The gates 5 for molding are arranged at positions on a line (X direction) including the optical axes 7 and the midpoints 6a of the long sides of the display surfaces 4a and the conditional expressions (3) and (4) are satisfied.

In Embodiment 1, as illustrated in FIG. 2, the gates 5 are arranged away from the effective regions 6. Moreover, the lines (directions) connecting the optical axes 7 and the gates 5 respectively in the positive lenses G3 for the left and right eyes are parallel to each other and the angle therebetween is $$|\alpha| = 0°.$$

In Embodiment 1, the phases, that is strain amounts in the positive lenses G3 for the left and right eyes are symmetric and the phase difference amount is thus $$\Delta rel = 0$$

and $$|\Delta rel/\lambda| = 0.$$

Figure 4:
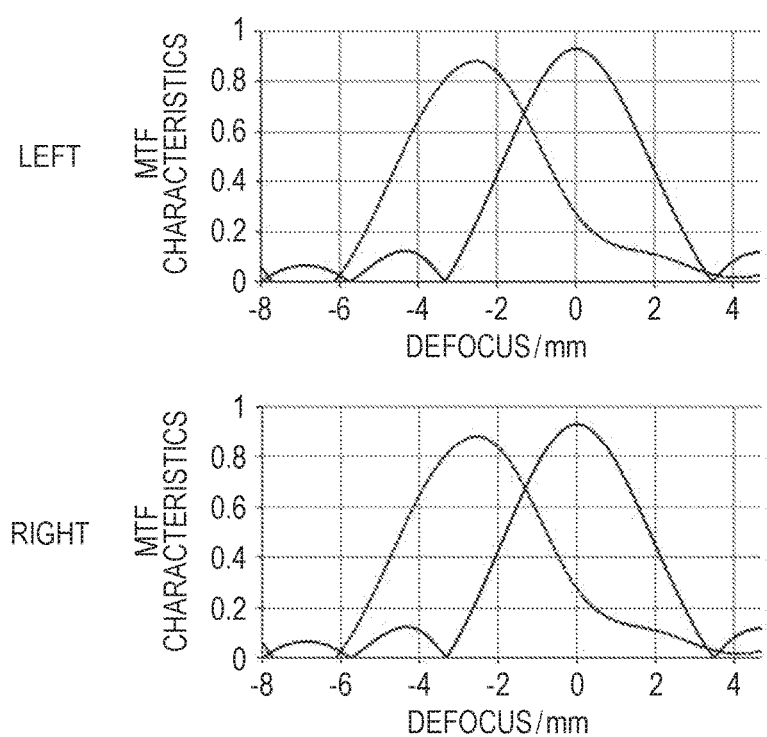
FIG. 4 includes graphs illustrating MTF of the ocular optical systems in Embodiment 1.

FIG. 4 illustrates MTF characteristics of a light flux at an observation angle of view of 0° and a light flux in a vertical (Y direction) maximum (50°) region in the maximum observation angle of view.

FIG. 4 corresponds to evaluation on the display element 4 side and the horizontal axis represents a defocus amount while the vertical axis represents the MTF characteristics for the d line and a spatial frequency of six lines/mm. Moreover, the solid lines represent the MTF characteristics of the light flux at an observation angle of view of 0° and the broken lines represent the MTF characteristics of the light flux at the maximum observation angle of view (on Y cross section). FIG. 4 depicts that there is no difference in the characteristics between the ocular optical systems for the left and right eyes regarding the light fluxes at the maximum angle of view.

Figure 5:
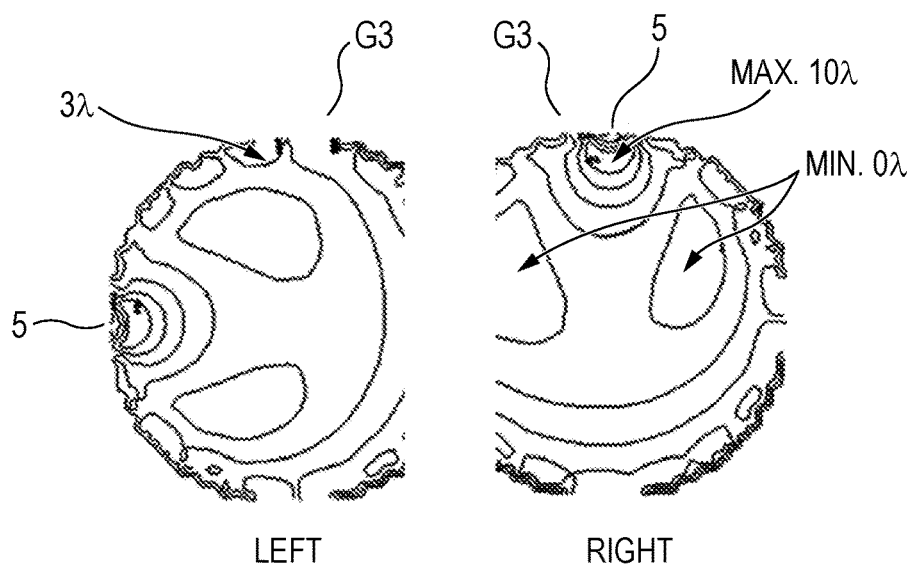
FIG. 5 is a view illustrating a phase map in the case where the positions of the molding gates in the lenses for the left and right eyes are orthogonal to each other.
Figure 6:
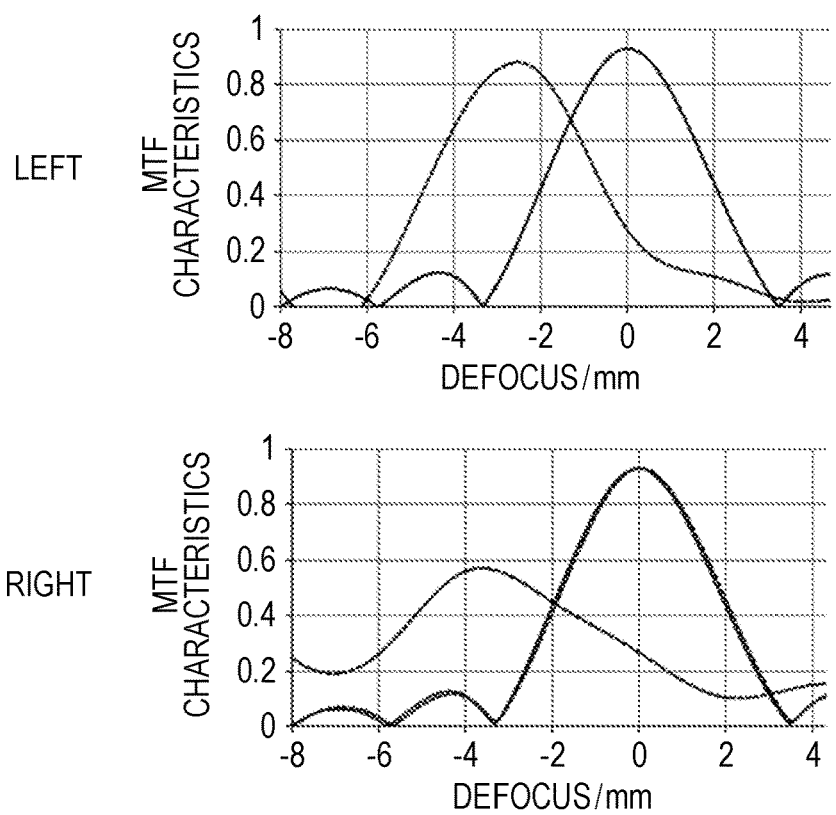
FIG. 6 includes graphs explaining MTF in the case where the phases of the molding gates are orthogonal to each other.

If the orientation of the gate 5 in the ocular optical system for the right eye is at 90° from, that is, orthogonal to the orientation of the gate 5 in the ocular optical system for the left eye, the phase differences in the ocular optical systems for the left and right eyes, that is, distortion distributions are asymmetrical as illustrated in FIG. 5. Due to this, particularly in the ocular optical system for the right eye, a light flux passing around the vertical (Y direction) region in the maximum observation angle of view passes a region where the optical distortion is great, that is, near the gate 5. Accordingly, there is a risk that the MTF characteristics become poor as illustrated in FIG. 6.

Thus, there is a risk that occurrence of optical performance difference between the ocular optical systems for the left and right eyes causes discomfort in binocular vision or affects image fusion. Accordingly, a specification like the conditional expression (4) is necessary.

In the embodiment, the gate 5 in each lens made of the resin material is arranged in consideration of a direction in which there is a clearance the effective region, that is in consideration of the display surface of the display element 4 and the effective light flux range 6, in order to avoid the risks described above, and the effect of the optical distortion is thereby reduced. Moreover, the conditional expression (5) is satisfied, where the maximum value of the optical distortion (phase difference) generated by each lens made of the resin material is Δ and the dominant wavelength (wavelength 550 nm) in observation is λ.

In Embodiment 1, the maximum optical distortion Δ is 10λ and the maximum phase difference is $|\Delta/\lambda|=10$ near the gate 5. Moreover, by arranging the resin lenses subjected to the lens cut closest to the display element 4, the weight reduction effect can be expected to be obtained in the lenses which are heavier and which have larger diameters. Furthermore, the lens cut may be performed on all lenses included in the ocular optical systems 2.

Embodiment 2

Figure 7:
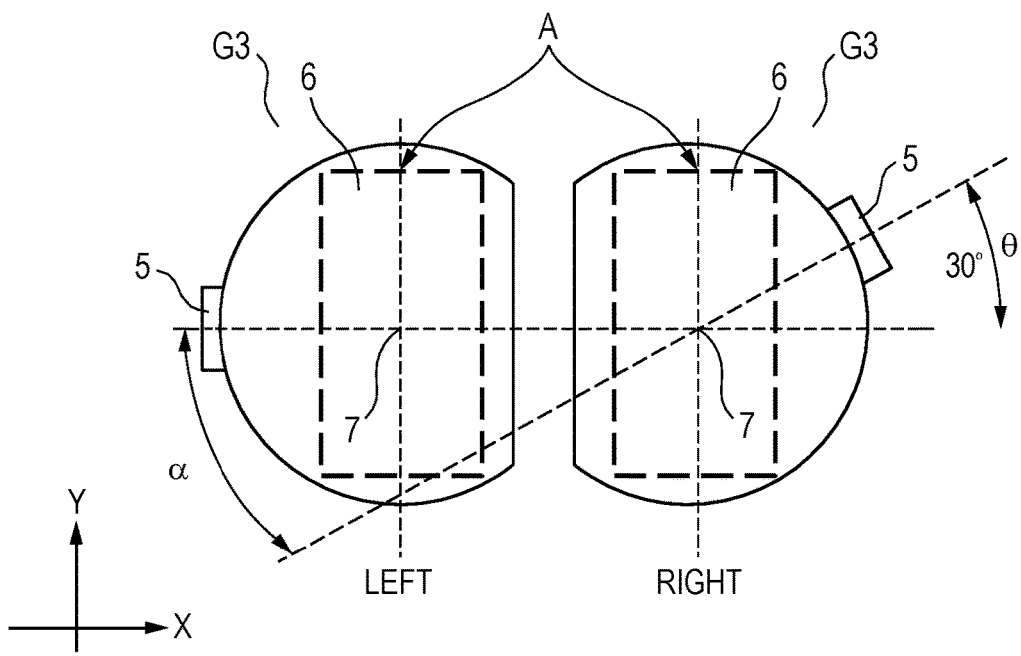
FIG. 7 is a diagram for explaining positions of the effective regions and the molding gates in the resin lenses used in an observation device in Embodiment 2.

An observation device in Embodiment 2 is described. In Embodiment 2, the positive lenses G3 arranged closest to the display elements 4 have large outer diameters. FIG. 7 illustrates cut shapes of the positive lenses G3. FIG. 7 is a diagram of the positive lenses G3 as viewed from the display element 4 side, and each positive lens G3 is cut by 14 mm in the interpupillary direction with respect to the outer diameter of φ70 mm (conditional expression (1)=0.20). Forming such cut shapes enables that, in ocular optical systems with a wide observation field of view, the optical axis positions of left and right ocular lenses can be appropriately adjusted for a person whose interpupillary distance is about 60 mm, which is about the average.

Moreover, FIG. 7 also illustrates the positions of the gates 5 used in the resin molding in the positive lenses G3 in the ocular optical systems 2 for the left and right eyes. In Embodiment 2, the position of the gate 5 of the ocular optical system for the right eye is turned counterclockwise by 30° relative to that of the gate 5 of the ocular optical system for the left eye.

Also in Embodiment 2, there are used the display elements 4 having the display surfaces 4a elongating in the vertical direction (Y direction) (illustrated). Thus, the effective regions 6 through which the light fluxes from the display elements 4 pass correspond to the regions surrounded by the one-dot chain lines.

Figure 8:
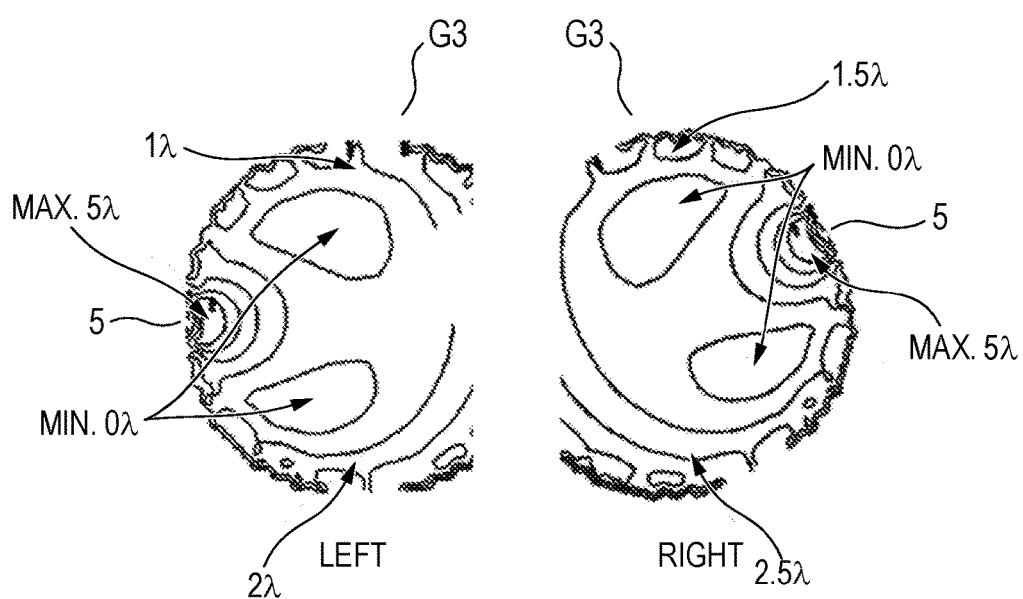
FIG. 8 is a diagram for explaining a phase map of the resin lenses included in the ocular optical systems in Embodiment 2.

FIG. 8 illustrates the optical distortions occurring in the positive lenses G3 as a phase difference map. FIG. 8 illustrates that the optical distortions are great near the gates 5 as in Embodiment 1. From the aforementioned description, the angle between the lines (directions) connecting the optical axes 7 and the gates 5 respectively in the positive lenses G3 for the left and right eyes is $|\alpha|=30°.$ Moreover, from FIG. 8, the amount of relative phase difference between the positive lenses G3 for the left and right eyes is $\Delta rel=5\lambda\ (5\lambda-0=5\lambda),$ and the relative phase is $|\Delta rel/\lambda|=0.5.$ FIG. 9 illustrates MTF characteristics of the light flux at the observation angle of view of 0° and the light flux in the vertical (Y direction) maximum (50°) region in the maximum observation angle of view.

Figure 9:
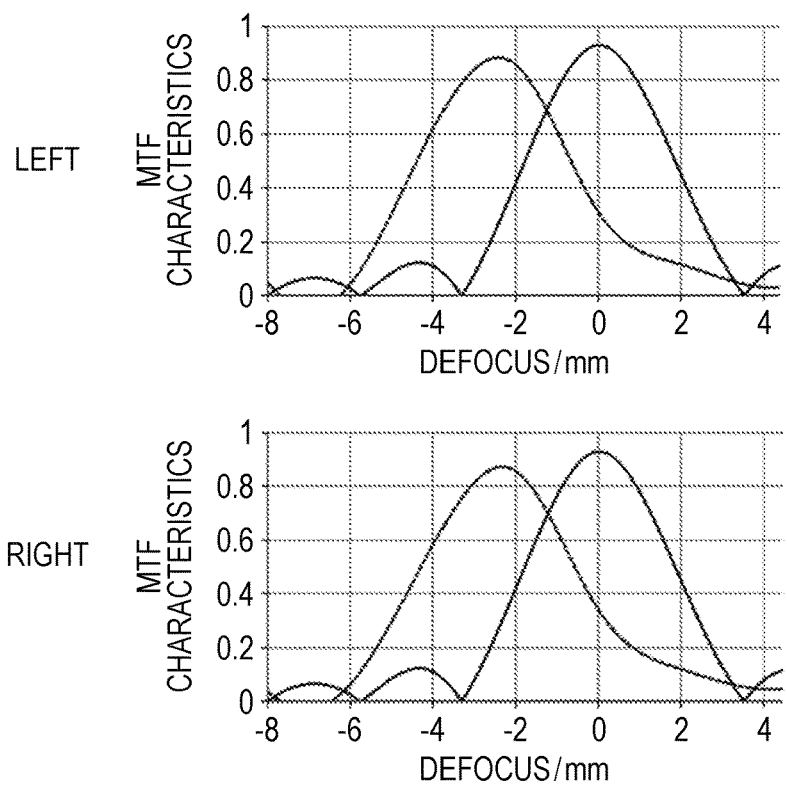
FIG. 9 includes graphs illustrating MTF of the ocular optical systems in Embodiment 2.

How to view the optical characteristics in FIG. 9 is the same as that in Embodiment 1 (FIG. 4). FIG. 9 depicts that a difference in the characteristics between the ocular optical systems for the left and right eyes regarding the light fluxes at the maximum observation angle of view is small in Embodiment 2. Moreover, in Embodiment 2, the maximum optical distortion Δ is 5λ and the maximum phase difference is $|\Delta/\lambda|=5$ near the gate 5. Furthermore, by arranging the resin lenses subjected to the lens cut closest to the display element 4, the weight reduction effect can be expected to be obtained in the lenses which are heavier and which have larger diameters. Other points are the same as those in Embodiment 1.

Embodiment 3

Figure 10:
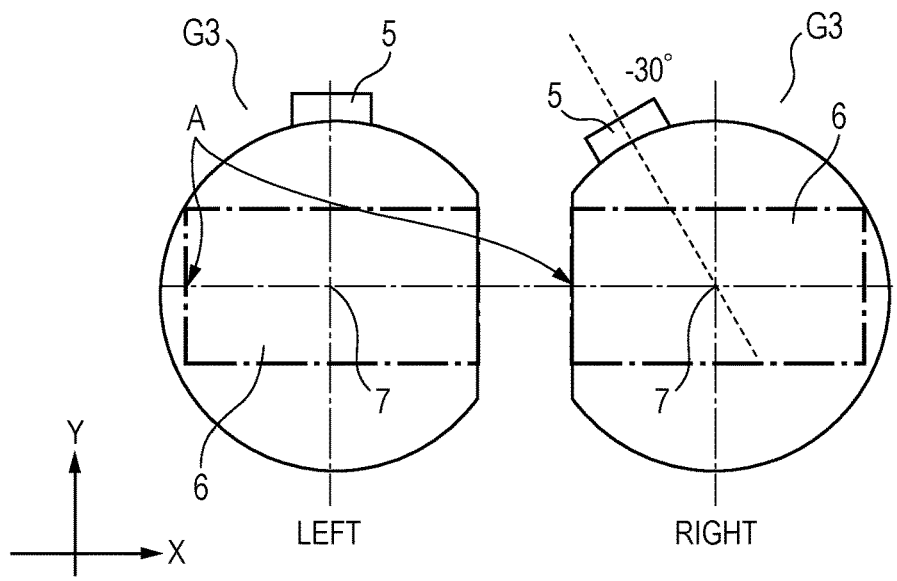
FIG. 10 is a diagram for explaining positions of the effective regions and the molding gates in the resin lenses used in an observation device in Embodiment 3.

An observation device in Embodiment 3 is described. In Embodiment 3, the positive lenses G3 arranged closest to the display elements 4 have large outer diameters. FIG. 10 illustrates cut shapes of the positive lenses G3.

FIG. 10 is a diagram of the positive lenses G3 as viewed from the display element 4 side, and each positive lens G3 is cut by 7 mm in the interpupillary direction with respect to the outer diameter of φ70 mm (conditional expression (1)=0.10). Forming such cut shapes enables that, in ocular optical systems with a wide observation field of view, the optical axis positions of the ocular optical systems for the left and right eyes can be appropriately adjusted for a person whose interpupillary distance is about 60 mm, which is about the average.

Moreover, FIG. 10 also illustrates the positions of the gates 5 used in the resin molding of the positive lenses G3 in the ocular optical systems for the left and right eyes. In Embodiment 3, the position of the gate 5 of the ocular optical system for the right eye is arranged to be turned counterclockwise by 30° relative to that of the gate 5 of the ocular optical system for the left eye.

Figure 11:
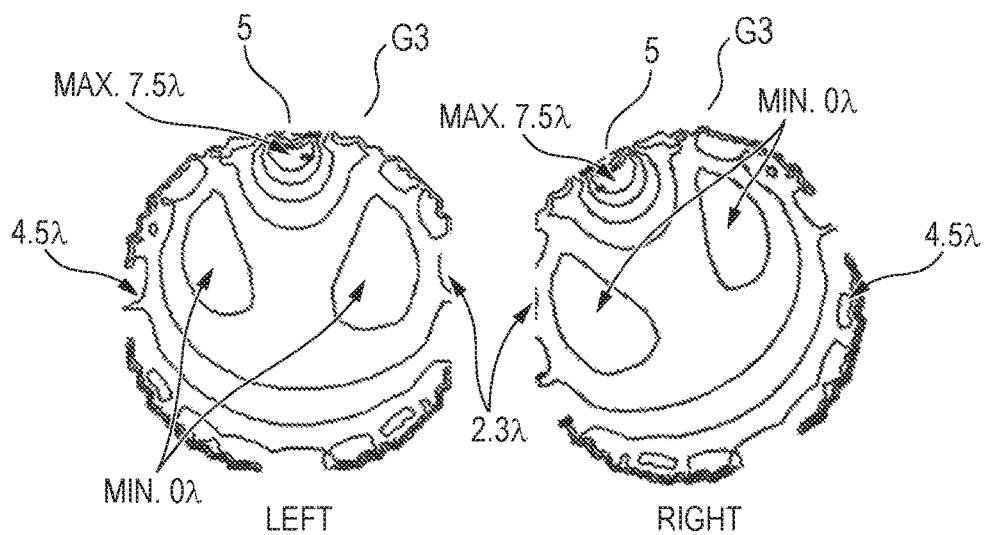
FIG. 11 is a diagram for explaining a phase map of the resin lenses included in the ocular optical systems in Embodiment 3.

In Embodiment 3, there are used the display elements 4 having the display surfaces 4a elongating in the horizontal direction (X direction) (illustrated). Thus, the effective regions 6 through which the light fluxes from the display elements 4 pass correspond to the regions surrounded by the one-dot chain lines. FIG. 11 illustrates the optical distortions occurring in the positive lenses G3 as a phase map. FIG. 11 illustrates that the optical distortions are great near the gates 5 as in Embodiment 1.

Figure 12:
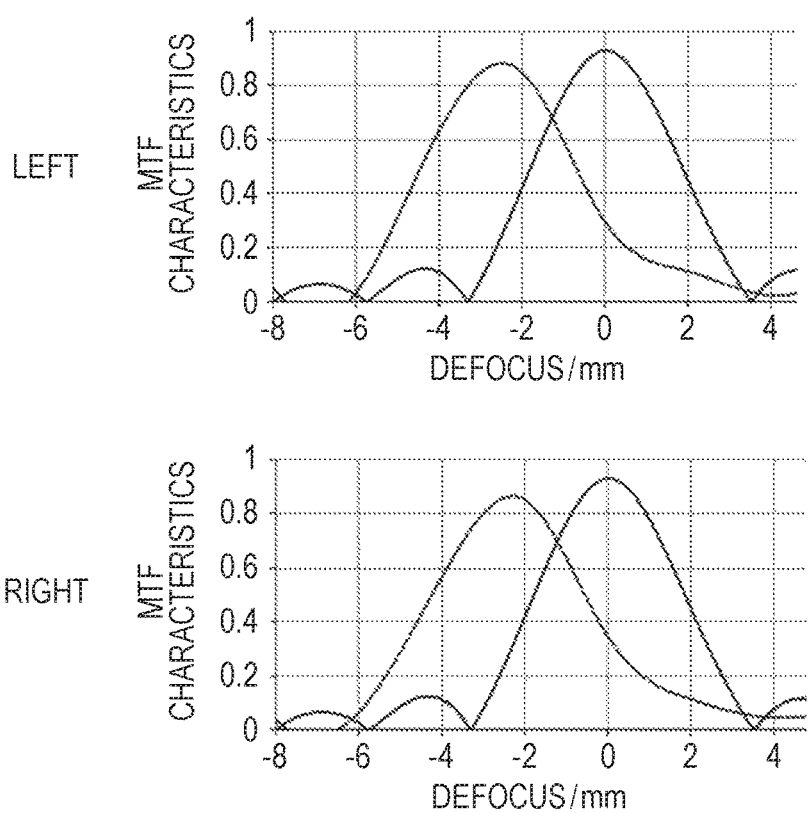
FIG. 12 includes graphs illustrating MTF of the ocular optical systems in Embodiment 3.

From the aforementioned description, the angle between the lines (directions) connecting the optical axes 7 and the gates 5 respectively in the positive lenses G3 for the left and right eyes is $|\alpha|=30°.$ Moreover, from FIG. 11, the amount of relative phase difference between the positive lenses G3 for the left and right eyes is $\Delta rel=2.2\lambda\ (4.5\lambda-2.3\lambda=2.2\lambda),$ and, the relative phase is $|\Delta rel/\lambda|=2.2.$ FIG. 12 illustrates MTF characteristics of the light flux at the observation angle of view of 0° and the light flux in a horizontal (X direction) maximum (50°) region in the maximum observation angle of view.

How to view the optical characteristics in FIG. 12 is the same as that in Embodiment 1 (FIG. 4). FIG. 12 depicts that a difference in the characteristics between the optical systems for the left and right eyes regarding the light fluxes at the maximum observation field of view (on X cross section) is small in Embodiment 3. Moreover, in Embodiment 3, the maximum optical distortion Δ is 7.5λ and the maximum phase difference is $|\Delta/\lambda|=7.5$ near the gate 5. Furthermore, by arranging the resin lenses subjected to the lens cut closest to the display element 4, the weight reduction effect can be expected to be obtained in the lenses which are heavier and which have larger diameters. Other points are the same as those in Embodiment 1.

The relationships among the embodiments and the conditional expressions (1) to (5) are depicted in Table 1. While the present invention has been described above with reference to preferred embodiments, the invention is not limited to these embodiments and the various modifications and changes can be made within the gist of the present invention.

Next, numerical data in Embodiment 1 is described below. In the description, i denotes an order number of a surface from the eye point 3, ri denotes the curvature radius of a lens surface, di denotes a lens thickness or an air space between the i-th surface and the i+1 surface, and ni and vi denote the refractive power and the Abbe number of the material between the i-th surface and the i+1 surface regarding the d line. The surface number 8 corresponds to the display surface 4a. Moreover, k, A4, A6, A8, A10, and the like stated for aspherical surfaces are aspherical coefficients. An aspherical shape is defined by the following expression, where the displacement in the optical axis direction at height h from the optical axis is denoted by x based on the surface vertex.

$$x=(h^2/R)/[1+\{1-(1+k)(h/R)^2\}^{1/2}]+A4h^4+A6h^6+A8h^8+A10h^{10}$$

Note that R in the expression is the curvature radius. Moreover, e-x means ×10$^{-x}$. In the data, the symbol * is attached to the left of the surface number of a lens surface having an aspherical surface.

[Numerical Data 1]

[unit: mm]

Surface data

| Surface number | r | d | nd | vd | Effective diameter |
|---|---|---|---|---|---|
| 1 (stop) | ∞ | 9.00 | | | 21.00 |
| 2* | 368.007 | 17.00 | 1.80400 | 46.6 | 51.37 |
| 3 | −38.688 | 0.15 | | | 56.97 |
| 4* | −50.950 | 5.50 | 1.63550 | 23.9 | 62.19 |
| 5* | −131.950 | 0.15 | | | 68.81 |
| 6 | 198.788 | 10.22 | 1.53110 | 55.9 | 69.85 |
| 7* | −392.872 | 44.43 | | | 72.02 |
| 8 (display surface) | ∞ | | | | |

Aspheric surface data

2nd surface

K = 0.00000e+000
A4 = −1.74725e−006
A6 = −7.02575e−009
A8 = 1.96813e−011
A10 = −1.49048e−014

4th surface

K = 0.00000e+000
A4 = 1.00483e−005

-continued

[unit: mm]

A6 = 5.99934e−009
A8 = −2.28468e−011
A10 = 1.28674e−014

5th surface

K = 0.00000e+000
A4 = 1.62422e−005
A6 = −1.44399e−008
A8 = 4.05958e−012

7th surface

K = 0.00000e+000
A4 = −3.47072e−006
A6 = 2.36922e−009
A10 = −2.81344e−017

Various data

| | |
|---|---|
| Zoom ratio | 1.00 |
| Focal length | 54.00 |
| F-number | 2.57 |
| Angle of view (deg.) | 50 |
| Image height | 56.7 |
| Total lens length | 86.5 |
| BF | 44.4 |
| Entrance pupil position | 0.00 |
| Exit pupil position | −40.38 |
| Front principal point position | 19.62 |
| Rear principal point position | −9.57 |

Zoom lens unit data

| Unit | Start surface | Focal length | Lens structure length | Front principal point position | Rear principal point position |
|---|---|---|---|---|---|
| 1 | 1 | 54.00 | 42.02 | 19.62 | −9.57 |

Single lens data

| Lens | Start surface | Focal length |
|---|---|---|
| 1 | 2 | 44.37 |
| 2 | 4 | −134.13 |
| 3 | 6 | 250.02 |

TABLE 1

| Conditional Expression | Embodiment 1 | Embodiment 2 | Embodiment 3 |
|---|---|---|---|
| (1) | 0.143 | 0.2 | 0.1 |
| (2) | 0° | 0° | 0° |
| | 0° | 30° | −30° |
| (3) | 0° | 30° | 30° |
| (4) | 0.0 | 0.5 | 2.2 |
| (5) | 10.0 | 5.0 | 7.5 |

While the present invention has been described with reference to exemplary embodiments, it is to be understood that the invention is not limited to the disclosed exemplary embodiments. The scope of the following claims is to be accorded the broadest interpretation so as to encompass all such modifications and equivalent structures and functions.

This application claims the benefit of Japanese Patent Application No. 2016-136677, filed Jul. 11, 2016, which is hereby incorporated by reference herein in its entirety.

What is claimed is:

1. An observation device comprising:
   a display element having a rectangular display surface; and
   a pair of ocular optical systems for use to observe an image displayed on the display surface, wherein
   each of the paired ocular optical systems includes a resin lens having a shape defined by an arc and a chord on a cross section perpendicular to an optical axis,
   the resin lens is provided with a molding gate in a portion of an outer periphery of the shape defined by the arc, and
   the following conditional expressions are satisfied:

$0.08 < Rc/D < 0.30$ $-35° \leq \theta \leq 35°$ $0° \leq |\alpha| < 40°$, where, on the cross section, Rc is a difference between a radius of a circle formed by extending the arc and a distance from a midpoint of the chord to the optical axis, D is a diameter of the circle, θ is an angle between a direction from the optical axis to a midpoint of a long side of the display surface and a direction from the optical axis to the molding gate and α is an angle between a direction from the optical axis to the molding gate of the resin lens included in one of the paired ocular optical systems and a direction from the molding gate of the resin lens included in the other ocular optical system to the optical axis.

2. The observation device according to claim 1, wherein the following conditional expression is satisfied:

$0.0 \leq |\Delta rel/\lambda| < 5.0$ where Δrel is an amount of phase difference between an optical distortion in the resin lens included in one of the paired ocular optical systems in a direction of the long side of the display surface and an optical distortion in the resin lens included in the other ocular optical system in the direction of the long side of the display surface, and λ, is an observation dominant wavelength.

3. The observation device according to claim 1, wherein the following conditional expression is satisfied:

$0.0 \leq |\Delta/\lambda| < 12.0$ where Δ is a maximum value of an optical distortion in the resin lenses, and λ, is an observation dominant wavelength.

4. The observation device according to claim 1, wherein the resin lens is arranged at a position closest to the display element in each of the ocular optical systems.

5. The observation device according to claim 1, wherein the resin lenses in the paired ocular optical systems are arranged such that the chords are adjacent to each other in the cross section.

* * * * *